F. G. KIMPEL.
SEAT FOR MOTOR CYCLES.
APPLICATION FILED MAY 20, 1913.
1,074,438.
Patented Sept. 30, 1913.
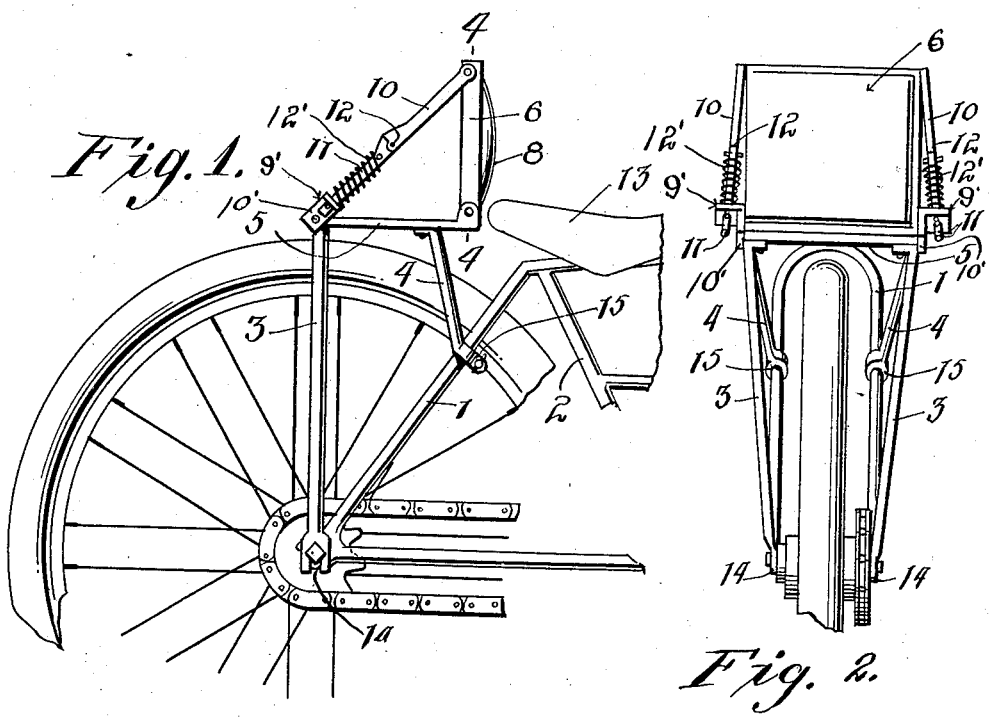
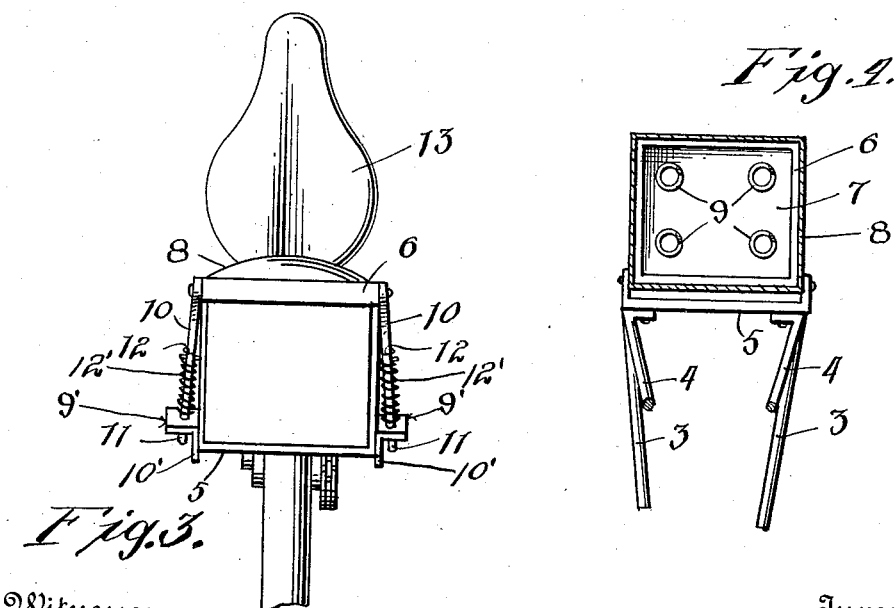
Witnesses
P. T. Williams
T. Sullivan
Inventor
F. G. Kimpel
By Chandler & Chandler
Attorneys

UNITED STATES PATENT OFFICE.

FRANK G. KIMPEL, OF EDGERTON, OHIO.

SEAT FOR MOTOR-CYCLES.

1,074,438.  Specification of Letters Patent.  Patented Sept. 30, 1913.

Application filed May 20, 1913. Serial No. 768,809.

*To all whom it may concern:*

Be it known that I, FRANK G. KIMPEL, a citizen of the United States, residing at Edgerton, in the county of Williams, State of Ohio, have invented certain new and useful Improvements in Seats for Motor-Cycles; and I do hereby declare the following to be a full, clear, and exact description of the invention, such as will enable others skilled in the art to which it appertains to make and use the same.

This invention is directed to improvements in auxiliary seats for motor-cycles, and has for its object to so construct a device of this character that it may be easily and quickly attached to or removed from the motor-cycle.

A further object of the invention is to provide a device of this character constructed in a manner which will provide a back rest for the occupant of the usual seat when unfolded, and when folded will serve as a seat for an additional rider.

With these and other objects in view, this invention resides in the novel features of construction, formation, combination and arrangement of parts to be hereinafter more fully described, claimed and illustrated in the accompanying drawing, in which:—

Figure 1 is a side elevation of a portion of a motorcycle, showing the device in place thereon. Fig. 2 is a rear elevation. Fig. 3 is a top plan view. Fig. 4 is a sectional view on line 4—4 of Fig. 1.

Referring to the drawing, the numeral 1 designates the rear fork, and 2 the seat post of a motorcycle, both of which are of the usual construction.

The auxiliary seat consists of a pair of rear legs 3 and front legs 4, the latter being of less length than the former so that the frame 5 will be positioned horizontally, said frame being secured to the upper ends of the legs 3 and 4 in any suitable manner.

Hingedly connected to the forward edge of the frame 5 is a combined back rest and seat 6, which consists of a frame 7, said frame being covered with suitable fabric 8 so as to inclose the helical springs 9, thereby producing a back rest or seat which will be comfortable.

To hold the back rest or seat in its unfolded or operative position, the same has pivotally connected thereto the brace bars 10, the lower ends of which are connected to similar bars 11 which have their lower ends slidably connected to the angular brackets 9', the vertical webs 10' of which are pivotally connected to the frame 5. The ends of the brace bars are connected by a rule joint 12 which permits the bars to break outwardly so that the back rest or seat may be folded upon the frame 5 when desired, and at which time the same serves as a seat for an additional rider.

From the foregoing description it will be seen that the occupant of the usual seat 13 only uses the back rest or seat when the same is in its unfolded position and an additional rider is not carried.

Coil springs 12' surround the bars 11, and are retained thereon in any suitable manner and serve to permit the back rest or seat 6 to yield when the back of the rider occupying the seat 13 is resting thereagainst, thus relieving the jar incident to traveling over the rough roadway.

The lower ends of the legs 3 are preferably provided with furcations 14, which span the rear axle of the motorcycle and are secured in place by the usual axle nuts, while the legs 4 are provided at their lower ends with clamps 15 which engage the fork 1, thus firmly supporting the auxiliary seat.

What is claimed is:—

In combination with a motorcycle, of a supplemental seat comprising front and rear legs, the former being clamped at their lower ends to the rear fork of the motorcycle and the latter having their lower ends supported by the rear axle of the motorcycle, a frame secured to the upper ends of the said legs, a back rest or seat pivotally connected to said frame, and rearward of the usual motorcycle seat, angular brackets pivotally connected to the seat, a pair of bars having their upper ends pivotally connected to the frame, a second pair of bars pivotally connected to the lower ends of the first named bars, and having their lower ends slidably and yieldably connected to the brackets, said back rest being held in its unfolded position by said bars, as and for the purpose set forth.

In testimony whereof, I affix my signature, in the presence of two witnesses.

FRANK G. KIMPEL.

Witnesses:
 HERMANN KIMPEL,
 SAMUEL FRITZ.

Copies of this patent may be obtained for five cents each, by addressing the "Commissioner of Patents, Washington, D. C."